United States Patent
Ball

[11] 3,844,204
[45] Oct. 29, 1974

[54] SLIDING WINDOW FILLER UNIT FOR AIR CONDITIONERS

[75] Inventor: Donald F. Ball, Brantford, Ontario, Canada

[73] Assignee: Keep Rite Products Limited, Ontario, Canada

[22] Filed: Mar. 29, 1973

[21] Appl. No.: 345,964

[52] U.S. Cl. ............................................ 98/94 AC
[51] Int. Cl. ............................................. E06b 7/02
[58] Field of Search ....................... 98/94 R, 94 AC

[56] References Cited
UNITED STATES PATENTS
3,680,258   8/1972   Loyd ...................................... 98/94

Primary Examiner—Meyer Perlin
Assistant Examiner—Ronald C. Capossela
Attorney, Agent, or Firm—Barnes, Kisselle, Raisch & Choate

[57] ABSTRACT

A filler panel assembly for an air conditioner mounted in a horizontal sliding window employing two identical inverted U-shaped frames assembled one above the other in the window opening with the lower ends of the legs of the upper frame connected to the upper edge of the lower frame by a joiner rail having vertically opposed slots. Each frame is formed with grooves around its inner periphery to receive a light transmitting panel. The upwardly facing slot in the joiner rail receives the lower edge of the upper light panel and the downwardly facing slot receives the upper edge of the lower frame. The lower ends of the lower frame are telescopically engaged with right angle brackets on the air conditioner side walls.

8 Claims, 6 Drawing Figures

SLIDING WINDOW FILLER UNIT FOR AIR CONDITIONERS

This invention relates to a window mounted air conditioner and, more specifically, to a filler panel unit for closing the opening above the air conditioner when the latter is mounted in a window of the horizontal sliding type.

When an air conditioner is mounted in the opening of a double-hung window the lower sash is usually supported on the top wall of the air conditioner housing and one or more side filler panels are employed to close the space between the side walls of the air conditioner and one or both side vertical jambs of the window frame. When an air conditioner is mounted in a window of the type employing a horizontal sliding window panel a filler panel must be utilized to close the opening between the top wall of the air conditioner casing and the top rail of the window frame. Since horizontal sliding windows vary considerably in height, the provision of filler panels normally requires an inventory of a plurality of filler panel units of various heights or the provision of a single filler panel unit of a particular size to cover a wide range of heights which requires a considerable amount of trimming and fitting to install the filler unit in the opening of a particular window.

The present invention has for its object the provision of a standard size filler panel unit which can be installed in a wide range of window openings of the horizontal sliding type in a simple manner.

It is a further object of the present invention to provide a filler panel assembly for extra high windows of the horizontal sliding type in the form of two standard sized filler panel units of idential construction with a simple joiner strip for interconnecting, in sealed relation, the lower edge of the upper filler unit with the upper edge of the lower filler unit.

Other objects and features of the present invention will become apparent from the following description and accompanying drawings, in which.

Figure 1:
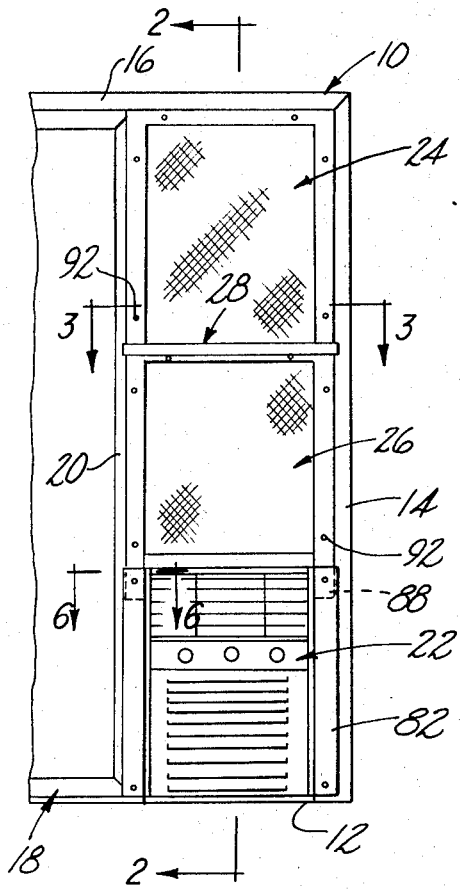
FIG. 1 is a fragmentary elevational view of an air conditioner with the filler panel assembly of the present invention mounted in the opening formed by a horizontal sliding window in which the air conditioner is mounted.
Figure 2:
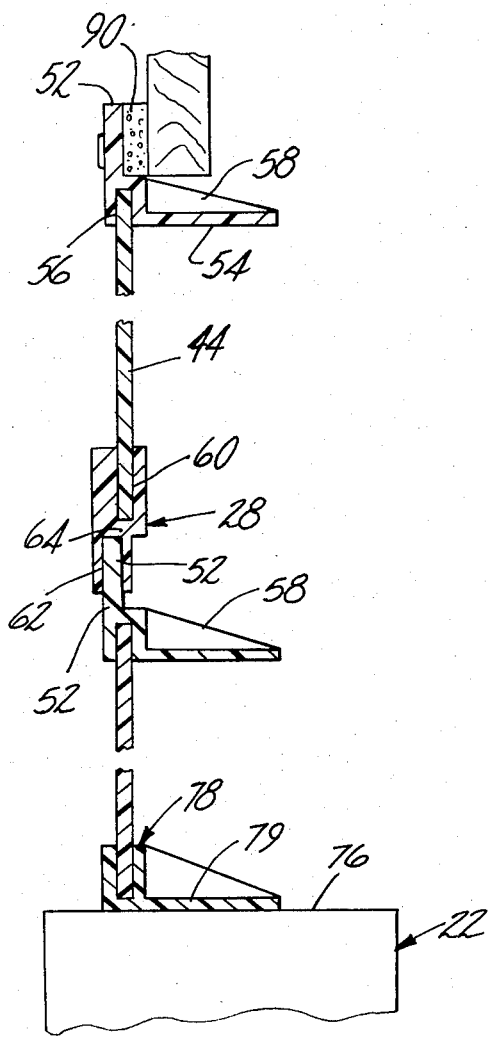
FIG. 2 is a sectional view along line 2—2 in FIG. 1.

Referring to FIG. 1, there is illustrated a window 10 of the horizontal sliding type, the frame of which includes a bottom rail 12, a vertical side rail 14 and a top rail 16. Bottom and top rails 12, 16 have tracks formed therein for accommodating a horizontally slideable window panel 18 having a vertical side rail 20. An air conditioner is designated at 22 and is suitably supported on the bottom rail 12 or sill of the window (not illustrated). Window panel 18 is partially opened to accommodate the air conditioner. In the arrangement shown in FIG. 1 a window having a large vertical dimension is illustrated. Accordingly, the rectangular space above air conditioner 22 between side rails 14 and 20 and top rail 16 is closed by an upper filler panel unit 24 and a lower filler panel unit 26 which are interconnected by a joiner rail 28. Filler panel units 24, 26 are of identical construction, each consisting of an inverted U-shaped frame 30 having vertically extending legs 32 at each side thereof interconnected by a top transversely extending leg 34.

Figure 3:
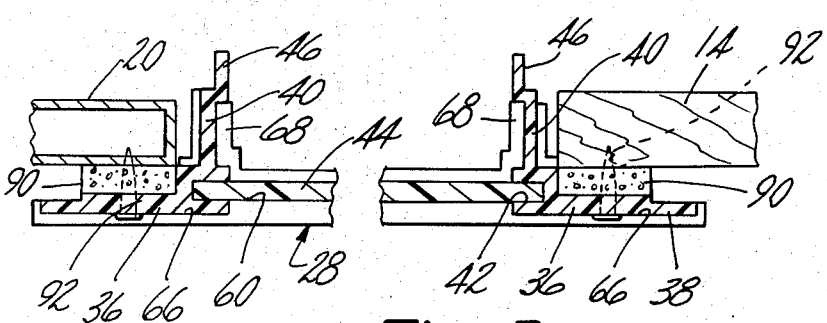
FIG. 3 is a sectional view along line 3—3 in FIG. 1.
Figure 4:
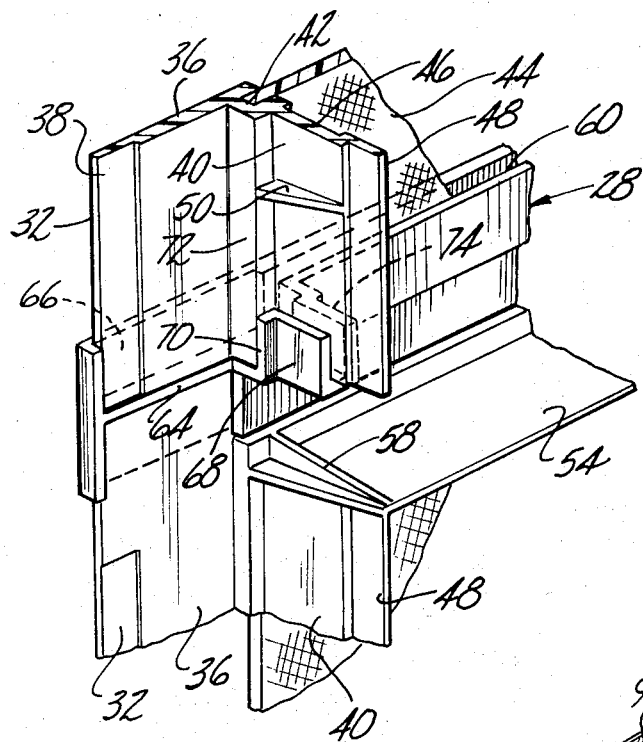
FIG. 4 is a fragmentary perspective view of the upper and lower filler panel units with the joiner strip therebetween.

Referring to FIGS. 3 and 4, each side leg 32 comprises a laterally extending flange 36 of reduced thickness adjacent its outer edge as indicated at 38. A flange 40 extends from the inner edge of flange 36 and is perpendicular thereto. The laterally inner face of flange 40 is formed with a vertical groove 42 to accommodate a preferably plastic, light transmitting panel 44. Adjacent groove 42 the inner face of flange 40 is fashioned with a shallow groove 46 and the free edge of flange 40 is of reduced thickness as at 48. Flange 40 is reinforced by a plurality of vertically spaced gussets 50 on the laterally outer face thereof.

The top leg 34 of the U-shaped frame 30 has a laterally upwardly extending flange 52 and a horizontally extending flange 54. Flanges 52, 54 are perpendicularly related and the inner face of flange 54 is fashioned with a groove 56 lying in the plane of grooves 42 to accommodate panel 44. Flange 54 is reinforced by gussets 58.

Joiner rail 28 has a vertically upwardly opening groove 60 which, when the joiner rail is assembled with frames 30, lies in the same vertical plane as groove 56 for receiving the lower edge of panel 44. Joiner rail 28 also has a downwardly opening groove 62 which is laterally offset inwardly from groove 60 and dimensioned to receive the vertical flange 52 of the lower U-shaped frame 30. Grooves 60, 62 are separated by a horizontal partition 64. At its opposite ends joiner rail 28 is formed with an offset pocket 66 above partition 64 for receiving the lower ends of the flanges 36 of side legs 32. As shown in FIG. 4, pocket 66 is offset slightly from groove 60 since flange 36 is offset from panel 44. On its back side (that is, the side facing the outside of the window) joiner rail 28 is formed adjacent each pocket 66 with an outwardly projecting, U-shaped strut 68 for receiving the lower ends of flanges 40 of side legs 32. The bottom wall of U-shaped strut 68 lies in the same horizontal plane as horizontal partition 64. Strut 68 is fashioned with an offset portion 70 to receive the vertical rib 72 in which groove 42 is formed and is also formed with a second offset portion 74 to interlock with the shallow groove 46 of each flange 40 as shown in FIG. 4. To simplify manufacture, frames 3o and joiner rail 28 are preferably injection molded plastic parts.

With the arrangement thus far described the lower ends of legs 32 of upper frame 30 are adapted to be inserted in pockets 66 and the U-shaped slots defined by struts 68 to firmly interlock the upper frame 30 with joiner rail 28 and thereby define a rectangularly shaped grooved opening for retaining panel 44. Likewise, when the upper frame 30 is interlocked with joiner rail 28 the whole assembly can be interlocked with lower frame 30 by inserting the vertical flange 52 of the upper leg 34 of lower frame 30 into downwardly opening groove 62 of joiner rail 28.

Figure 5:
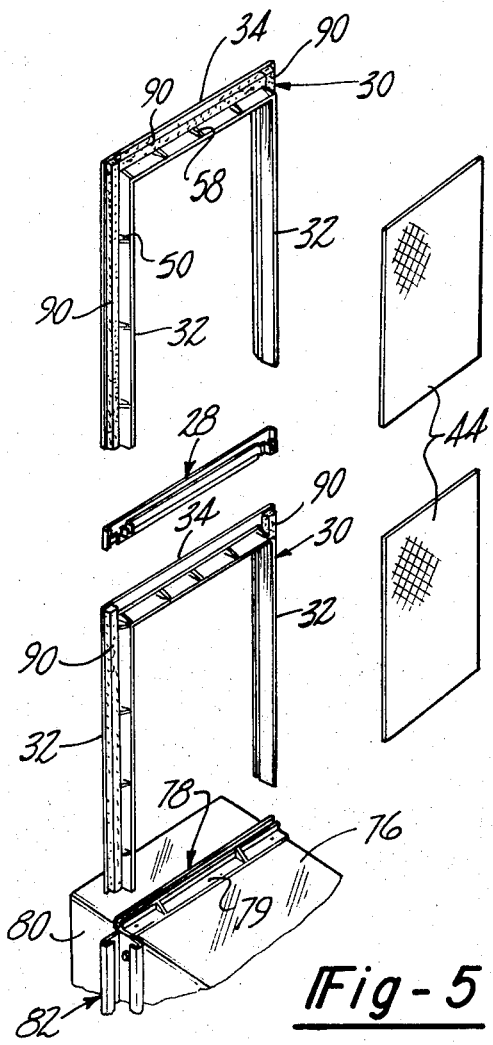
FIG. 5 is an exploded fragmentary perspective view showing the manner in which the filler panel assembly is assembled.
Figure 6:
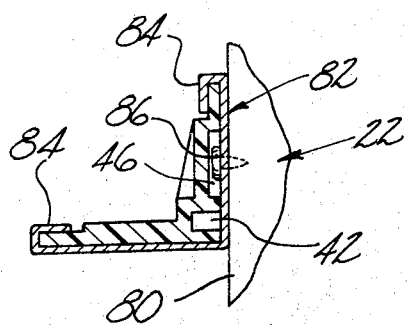
FIG. 6 is a sectional view along line 6—6 in FIG. 1.

In order to interconnect the two assembled frames with the air conditioner 22 the top wall 76 of the air conditioner casing has secured thereto a U-shaped channel 78 having a reinforced horizontal flange 79 through which metal screws (not illustrated) may be driven for securing channel 78 in place. Likewise, each side wall 80 of the air conditioner housing has a sheet metal right angle bracket 82 secured thereto. Brackets 82 extend vertically and, as shown in FIGS. 5 and 6, the free vertical edges of the two legs of the bracket are return bent as at 84 to form channels which are dimensioned and arranged to receive and interlock with the thinner flange portions 38 and 48 of flanges 36 and 40, respectively, of the two side legs 32 of frames 30. As shown in FIG. 6, right angle brackets 82 are adapted to be mounted on the air conditoner casing by sheet metal screws 86. Grooves 46 accommodate the head of screws 86 when the lower ends of the side legs 32 of lower frame 30 are telescoped downwardly into brackets 82.

If the height of the window in which the air conditioner is installed is such that the space above the air conditioner can be closed by a single frame 30, then the single frame 30 has the lower ends of its legs 32 telescoped downwardly into right angle brackets 82 and the panel 44 is trimmed in height, if necessary, to close the opening defined by frame 30 and channel 78. On the other hand, if the height of the window is such that it requires more than one frame 30 to close the opening above the air conditioner, then two or more frames 30 can be employed in the manner illustrated in FIGS. 1, 2, 4 and 5. When two frames are employed upper frame 30 is trimmed in height to a slightly lesser dimension than lower frame 30 by the distance which the lower ends of legs 32 of the lower frame are telescoped into brackets 82. These telescoped portions are designated 88 in FIG. 1. With the upper frame trimmed in height in this manner an aesthetic appearance will be presented since joiner rail 28 can be located so that it will extend horizontally across the opening midway between the upper and lower ends thereof. When three frames are employed the joiner rails can be located to divide the space above the air conditioner into three panels of generally equal height. In order to produce a weatherproof filler panel construction weather stripping is cemented or otherwise secured to the outer or back faces of the side flages 36 of legs 32 and the horizontal flange 52 of the top frame 30. This weather stripping can ideally be formed as a soft urethane strip as indicated at 90. After a unit is completely assembled it can be fixedly secured in place by sheet metal screws 92 which are driven through the flanges of the two frames and into the respective members of the window frame 10 and panel 18 which the outer flanges of the unit overlap.

I claim:

1. A filler panel assembly for closing the opening above an air conditioner mounted in a window of the type having a horizontally sliding panel wherein one side wall of the air conditioner is positioned adjacent one side of the window frame and the sliding panel is at least partially opened and positioned against the opposite side wall of the air conditioner comprising, a plurality of inverted U-shaped frames of substantially identical shape positioned one above the other in said opening with the adjacent ends of the vertically adjacent frames interconnected by a joiner rail, each frame having a pair of vertical side legs integrally connected at their upper ends by a horizontal top leg, each of said legs having a laterally outwardly extending flange adapted to overlie the inner room-facing surfaces of the side and top members of said window frame and panel which define said opening, said legs also having a second flange extending perpendicularly to said lateral flanges and adapted to extend outwardly through said opening and overlie the inner peripheral surfaces of said members, a bottom rail adapted to be mounted on the top wall of the air conditioner so as to extend between the lower end portions of the side legs of the lowermost frame, said bottom rail having an upwardly opening groove extending lengthwise thereof, each of said second flanges of the side and top legs of said frames having a groove extending lengthwise thereof and opening laterally inwardly from the inner faces of the respective flanges, said grooves all lying in the same vertical plane, said joiner rail comprising a vertically disposed flange extending horizontally between the lower ends of the side legs of the next vertically adjacent frame, said last-mentioned flange having a downwardly opening groove extending lengthwise thereof for receiving the upper edge portion of the lateral flange of the top leg of the next lower frame and having an upwardly opening groove extending lengthwise thereof which lies in the same vertical plane as said grooves in said frames and bottom rail when the downwardly opening groove in the joiner rail is engaged with the upper edge portion of the lateral flange of the top leg of the next lower frame, and a panel seated in the grooves of each frame and the upwardly opening grooves in each filler rail and bottom rail.

2. The combination called for in claim 1 wherein the plane of the grooves in said flanges is offset outwardly from the plane of said lateral flanges.

3. The combination called for in claim 2 wherein the plane of said upwardly opening groove is offset outwardly from the plane of the downwardly opening groove in said joiner rail.

4. The combination called for in claim 3 wherein the joiner rail is formed with an upwardly opening pocket at each end thereof for receiving the lower ends of the first-mentioned flanges on the side legs of the next upper frame, said pockets lying in the vertical plane of said downwardly opening groove in the joiner rail.

5. The combination called for in claim 1 wherein said joiner rail is formed with an upwardly opening pocket at each end thereof for receiving the lower ends of the first mentioned flanges on the side legs of the next upper frame.

6. The combination called for in claim 5 wherein the joiner rail has a U-shaped strut at each end thereof disposed perpendicularly to said pockets for receiving the lower ends of the second mentioned flanges on the side legs of the next upper frame.

7. The combination called for in claim 6 wherein the opposite side walls of the air conditioner have vertically extending right angle brackets mounted thereon, the free vertical edges of the legs of said brackets being return bent to form channels for receiving the perpendicularly related flanges at the lower ends of the side legs of the lowermost frame.

8. The combination called for in claim 7 wherein the laterally inner faces of the second flanges of the vertical legs of said frames have a laterally inwardly opening groove therein extending lengthwise thereof intermediate the inner and outer edges of the last-mentioned flanges to accommodate the heads of screws utilized for securing said right angle brackets to the side walls of the air conditioner.

* * * * *